(12) United States Patent
Bock

(10) Patent No.: US 8,226,031 B2
(45) Date of Patent: Jul. 24, 2012

(54) LUGGAGE LOCKER AND ASSOCIATED DOOR WHICH ARE INTENDED IN PARTICULAR FOR AN AIRCRAFT

(75) Inventor: Thomas-Mathias Bock, Grenade-sur-Garonne (FR)

(73) Assignee: Airbus, Blagnac (FR)

( * ) Notice: Subject to any disclaimer, the term of this patent is extended or adjusted under 35 U.S.C. 154(b) by 290 days.

(21) Appl. No.: 12/374,756

(22) PCT Filed: Jul. 24, 2007

(86) PCT No.: PCT/FR2007/001270
§ 371 (c)(1),
(2), (4) Date: Jan. 22, 2009

(87) PCT Pub. No.: WO2008/012427
PCT Pub. Date: Jan. 31, 2008

(65) Prior Publication Data
US 2009/0250553 A1    Oct. 8, 2009

Related U.S. Application Data

(60) Provisional application No. 60/844,075, filed on Sep. 13, 2006.

(30) Foreign Application Priority Data

Jul. 24, 2006   (FR) ...................................... 06 06735

(51) Int. Cl.
*B64D 11/00* (2006.01)
(52) U.S. Cl. ..................................... 244/118.1; 312/248

(58) Field of Classification Search ............... 244/118.5, 244/118.1; 312/242, 245, 246, 248, 319.1, 312/319.2
See application file for complete search history.

(56) References Cited

U.S. PATENT DOCUMENTS
4,275,942 A    6/1981   Steidl
(Continued)

FOREIGN PATENT DOCUMENTS
DE    44 25 869    2/1996
(Continued)

OTHER PUBLICATIONS

U.S. Appl. No. 12/377,012, filed Feb. 10, 2009, Bock.
(Continued)

*Primary Examiner* — Robert Canfield
*Assistant Examiner* — Jessie Fonseca
(74) *Attorney, Agent, or Firm* — Oblon, Spivak, McClelland, Maier & Neustadt, L.L.P.

(57) ABSTRACT

A rack includes a compartment which has an open face for inserting and removing luggage, a lower face and an end wall opposite the open face. This compartment is mounted such that it can pivot about a fixed pivot axis between an open position in which the open face of the compartment is accessible, and a closed position in which the open face of the compartment is retracted. It also includes a door that is pivot-mounted in such a way that this door impedes access to the open face when the compartment is in the closed position and allows free access to this face when the compartment is open. A connection mechanism connects the door and the compartment of the luggage rack in such a way that the pivoting movement of the compartment causes the door to pivot.

14 Claims, 3 Drawing Sheets

U.S. PATENT DOCUMENTS

| | | | |
|---|---|---|---|
| 5,383,628 A * | 1/1995 | Harriehausen et al. | 244/118.1 |
| 5,456,529 A | 10/1995 | Cheung | |
| 5,567,028 A * | 10/1996 | Lutovsky et al. | 312/246 |
| 5,988,565 A * | 11/1999 | Thomas et al. | 244/118.1 |
| 6,398,163 B1 * | 6/2002 | Welch et al. | 244/118.1 |
| 6,857,603 B2 * | 2/2005 | Lau et al. | 244/118.1 |
| 6,991,276 B2 * | 1/2006 | McCauley et al. | 296/37.7 |
| 7,118,068 B2 * | 10/2006 | Graf et al. | 244/118.5 |
| 2002/0101090 A1 | 8/2002 | Steingrebe et al. | |
| 2003/0117047 A1 * | 6/2003 | Heidmann et al. | 312/323 |
| 2005/0040287 A1 * | 2/2005 | Stephan et al. | 244/118.5 |
| 2005/0224643 A1 * | 10/2005 | Graf et al. | 244/118.1 |
| 2007/0018044 A1 | 1/2007 | Bock | |
| 2007/0095980 A1 | 5/2007 | Bock | |
| 2007/0095981 A1 | 5/2007 | Bock | |
| 2007/0164154 A1 | 7/2007 | Bock | |
| 2007/0236228 A1 | 10/2007 | Bock | |

FOREIGN PATENT DOCUMENTS

| | | |
|---|---|---|
| RU | 2 219 080 | 12/2003 |
| RU | 2004 137 102 | 5/2006 |
| WO | 95 18040 | 7/1995 |
| WO | WO 2008/040868 A1 | 4/2008 |

OTHER PUBLICATIONS

U.S. Appl. No. 12/443,093, filed Mar. 26, 2009, Bock.
Decision to Grant issued Jun. 17, 2011 in Russian Application No. 2009106056.

* cited by examiner

LUGGAGE LOCKER AND ASSOCIATED DOOR WHICH ARE INTENDED IN PARTICULAR FOR AN AIRCRAFT

BACKGROUND OF THE INVENTION

1. Field of the Invention

This invention relates to a baggage bin and an associated door intended in particular for an aircraft.

2. Discussion of the Background

The field of this invention is the transport of passengers in an aircraft. During a trip, the travelers' baggage is arranged in the holds of the aircraft while lighter baggage may accompany the travelers in the cabin of the aircraft. In this cabin, storage spaces are provided for the latter baggage, also referred to as carry-on baggage. More often than not, these storage spaces are arranged in the top portion of the cabin of the aircraft, beneath the ceiling of this cabin and above the seats intended for accommodating the passengers.

Two major types of storage spaces for baggage exist in aircraft. On the one hand fixed baggage bins, and on the other hand pivoting baggage compartments, are known. There is referred to here as baggage bin a storage space having a section that is fixed in relation to the cabin of the aircraft, as well as a door, generally pivoting, allowing the opening and closing of access to the baggage section. As for a baggage compartment, it also has a section provided with an access making it possible to put in and take out baggage. Here this section is a section that can be moved between a first extended position in which access to the section is open and a position retracted inside the ceiling of the cabin of the aircraft and in which access to the section is closed.

In these two types of storage spaces, considerable constraints exist as regards esthetics. As a matter of fact, on the one hand a section is fixed and imposes its form on the interior of the cabin of the aircraft. On the other hand, the form of the ceiling is imposed in order to be able to act as a shutter for the movable sections when the latter are to be closed.

SUMMARY OF THE INVENTION

This invention then has as its purpose to provide a storage space for baggage in an aircraft cabin that makes it possible to allow free rein for defining the form that the designers wish to impart to the interior space of the aircraft.

To this end, it proposes a compartment for baggage, intended in particular for an aircraft cabin, comprising a section having an open face allowing access to the section for putting in and taking out baggage or similar items inside the latter, a lower face intended to accommodate the baggage, as well as a back opposite the open face of the section, this section being mounted pivoting around a fixed axis of pivoting between an open position in which the open face of the section is accessible to a user, and a closed position in which the open face of the section is retracted.

According to the invention, such a baggage compartment furthermore comprises a door mounted pivoting so that this door forms a barrier to access to the open face of the section when the section is in closed position and allows free access to this face when the section is in open position, and connection means join the door and the section of the baggage compartment so that the pivoting movement of the section brings about the pivoting of the door and/or vice versa.

In this way, two components are movable in the baggage compartment: the section and the pivoting door. This allows a greater latitude in the design of the form of the compartment and the space in which it is arranged. As a matter of fact, in the closed position of the baggage compartment, the form of the door comes to take on the form desired for the layout of the cabin (or other). As this door is movable, it then may come to assume a retracted position allowing access to the inside of the section of the baggage compartment.

In an advantageous embodiment, in open position of the section the lower face is inclined on the horizontal by an angle ranging, for example, between 0° and 10° on the side of the open face so as to facilitate the removal of a piece of baggage, whereas in closed position of the section, the lower face is inclined on the horizontal on the side of the back of the section. In this way, in closed position, the baggage stored in the section naturally tends though gravity to go toward the back of the section, which then serves as a stop.

In order to facilitate the movement of the section of the baggage compartment, the axis of pivoting of the section is more or less centered in relation to the back and the open face of the section.

A preferred embodiment of the invention provides that the lower face of the section comprises an outer casing, and that the pivoting door is in the extension of this outer casing in the closed position of the section. The outer casing thus makes it possible to adapt the form of the baggage compartment to the form of the exterior space. In this embodiment, the axis of pivoting of the door advantageously is parallel to the axis of pivoting of the section, and this axis preferably is on the side of the door opposite the outer casing of the lower face of the section. This configuration makes it possible to have a simple relative movement of the two movable components. It also may be provided that the pivoting door is in the extension of an upper face of the section in the open position of the latter.

One embodiment provides that the connection means comprise a lever for transmission of movement connecting the door and the section. This embodiment has the advantage of being simple to implement, reliable and low in cost price. In this embodiment, the lever may have a first arm fastened to the door near the axis of pivoting of the door, as well as a second arm mounted between on the one hand the end of the first arm opposite the door, and on the other hand the section by means of a pivot connection. A reversing mechanism with other types of connection or else also a mechanism with more than two arms likewise may be contemplated. That all depends on the movement sought to be produced. As the invention seeks to allow a great latitude in the form of the pivoting door and also of the baggage section, many variants of the connection mechanism between these two components may be contemplated, in order to fit various forms.

In order to have a simpler mechanism, it is preferable that the connection means between the section and the door be such that during a movement, the section and the door pivot in the same direction.

This invention also relates to an aircraft cabin comprising a ceiling, characterized in that it comprises at least one baggage compartment such as described above, and in that the door mounted pivoting is integrated into the ceiling of the cabin.

Finally, the invention relates to an aircraft, characterized in that it comprises at least one baggage compartment and/or a cabin such as described above.

BRIEF DESCRIPTION OF THE DRAWINGS

Details and advantages of this invention will emerge more clearly from the description that follows, presented with reference to the attached schematic drawings on which:

FIG. 2 is a view corresponding to FIG. 1 showing the baggage compartment in intermediate position, while

DETAILED DESCRIPTION OF THE PREFERRED EMBODIMENTS

Figure 1:
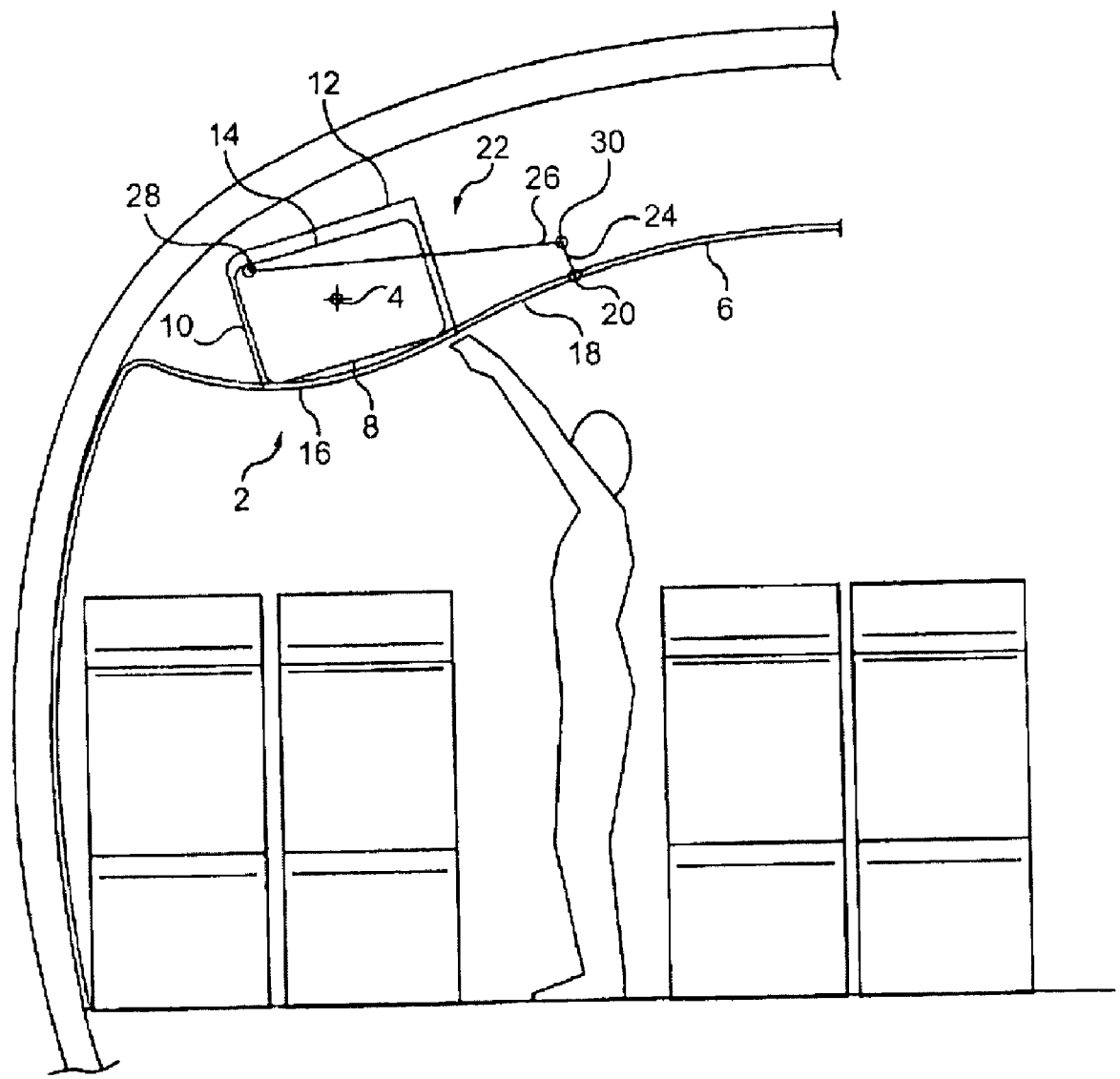
FIG. 1 is a schematic view in cross section of a baggage compartment according to the invention, as well as partially also of an airplane cabin, the compartment being in closed position.

The drawings show a baggage compartment 2 mounted pivoting around an axis of pivoting 4. Here it is a matter of a baggage compartment 2 mounted in an aircraft cabin. This compartment is mounted in the upper portion of this cabin, above the seats intended to accommodate passengers. The axis of pivoting 4 is a longitudinal axis in relation to the cabin of the aircraft. As clearly visible on the drawings, this axis is fixed in relation to the cabin. The ceiling 6 of this cabin is seen on the drawings.

The baggage compartment comprises a section intended to accommodate baggage. This section has a lower outer face 8, a back 10, an upper face 12 and side walls 14. The form of this section is more or less parallelepipedal. The lower face 8 is covered on the outside by an outer casing 16 slightly rounded so as to form a convex outer face. The face opposite the back 10 is a fully open face.

On FIG. 1, the baggage compartment is shown in its closed position. It then is retracted into the ceiling 6 of the aircraft cabin. The casing 16 follows the form of this ceiling. A door 18 in the extension of the casing 16 and itself connected to the ceiling 6 then also is seen. As emerges from the different Figures, this door 18 is pivoting. In the embodiment shown, its axis of pivoting 20 extends parallel to the axis of pivoting 4 of the section of the baggage compartment 2. In the preferred embodiment shown, it also is seen that this axis of pivoting 20 is located at the joining of the pivoting door 18 and the ceiling 6, that is, on the side of the door opposite the section of the baggage compartment and the casing 16 of the latter.

The axis of pivoting 4 of the section of the baggage compartment is perpendicular to the side walls 14 of this section and is located more or less at the center of the open front face, the back 10, the lower face 8 and the upper face 12. This axis of pivoting therefore is located more or less half-way between the open face and the back 10 just as it is more or less half-way between the lower face 8 and the upper face 12 in this preferred embodiment.

It is seen here that in its closed position, the lower face 8 of the section is inclined toward the back 10. In this way, through gravity, the baggage placed in the section and supported by the lower face 8 tends to come to rest against the back 10 of the section. In this way, it tends to stay in the section and not come out through the open face of the latter.

The section and the pivoting door 18 are connected by a lever 22. This lever has a first arm 24 and a second arm 26.

The first arm 24 is fastened to the pivoting door 18. In a preferred embodiment, this first arm extends perpendicular to the axis of pivoting 20 of the pivoting door 18 and is located in the same plane as this axis 20. Moreover, still for this preferred embodiment, the first arm 24 is more or less perpendicular to the pivoting door 18.

The second arm 26 of the lever 22 connects the section of the baggage compartment 2 to the first arm 24. The second arm is connected by a pivot connection 28 to a side wall 14 of the section. Another arrangement for joining of the lever 22 to the section may be contemplated. The pivot connection 28 comprises, for example, a shaft and a bearing. The shaft may be integral with the second arm 26 and the bearing may be integral with the side wall 14 or vice versa. The connection between the second arm 26 and the first arm 24 also is implemented with the aid of a pivot connection having, for example, the form of a hinge 30. The pivot connection 28 is arranged on the side wall 14 near the intersection of the back 10 with the upper wall 12.

The description presented above describes only one lever 22. It is possible, of course, to have such a lever associated with each side wall 14. As already noted, the lever connecting the pivoting door and the section of the baggage compartment may come to be attached at different points of the section and of the pivoting door. The connection between the section and the pivoting door may be provided by means other than a lever, for example a gear-train. The latter solution, although it may be contemplated, has a higher cost price.

Other connections also may be contemplated.

Figure 2:
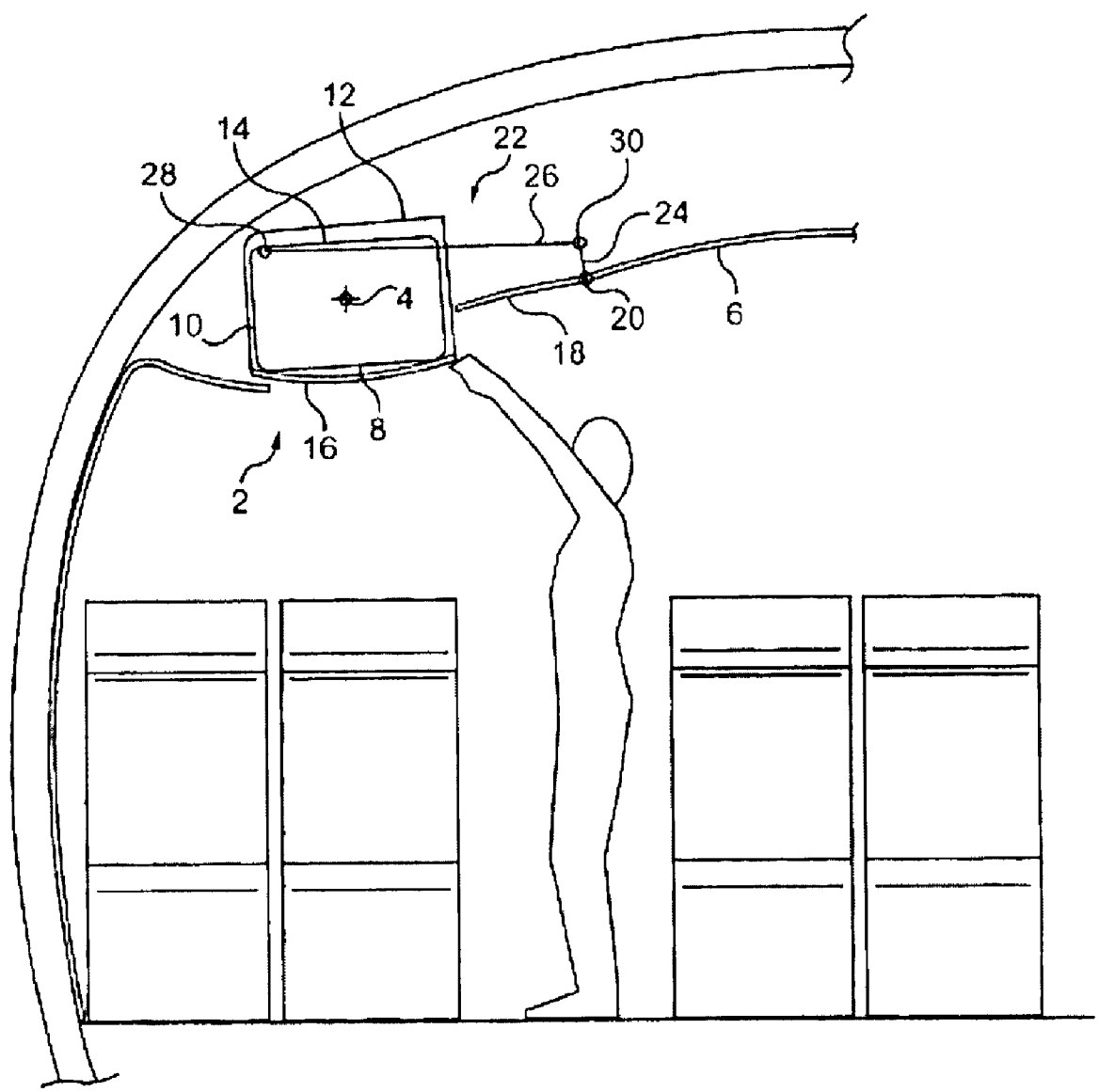
Figure 3:
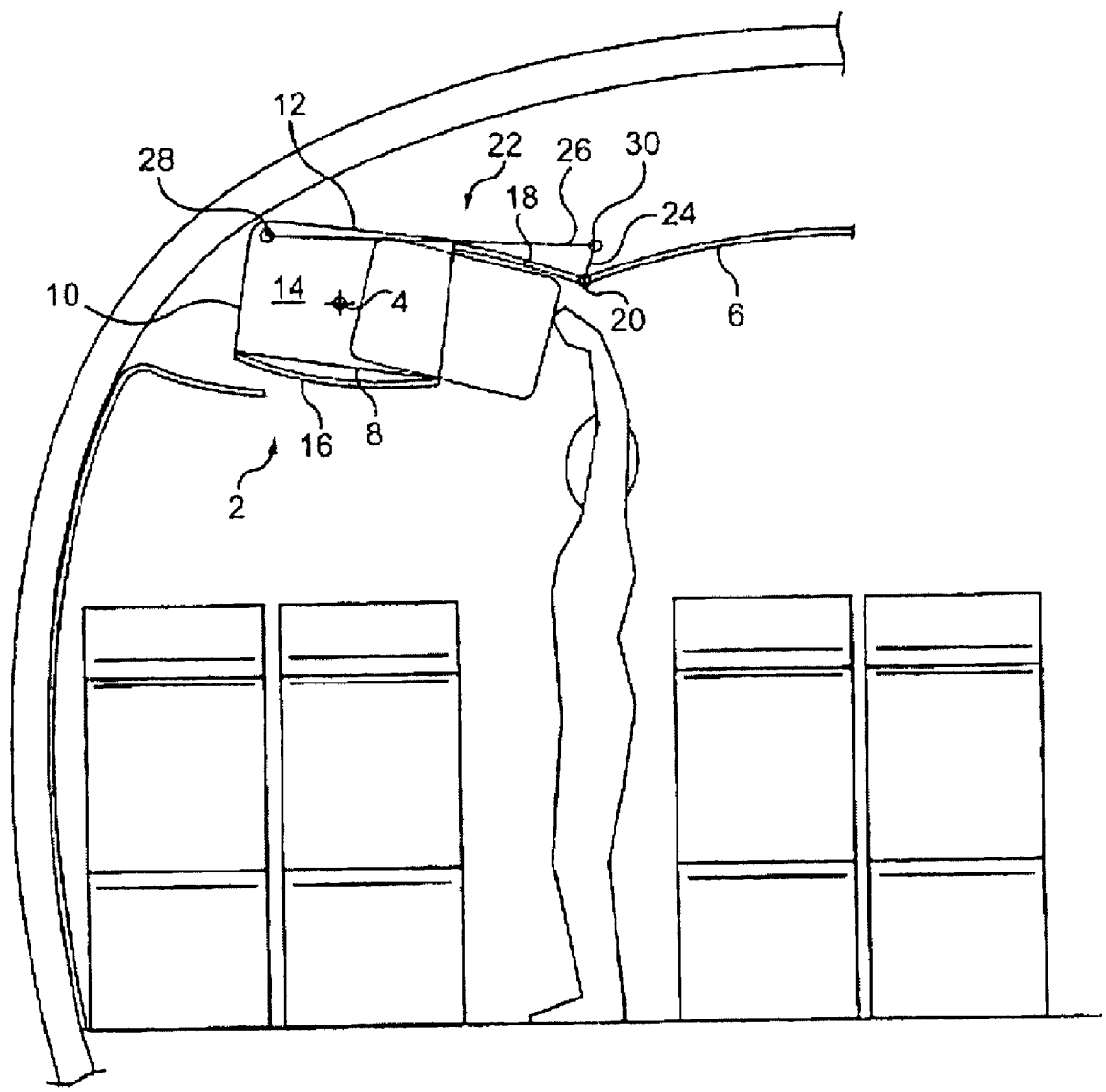
FIG. 3 shows this baggage compartment in closed position, in a similar view.

FIGS. 1 to 3 show three relative positions of the section of the baggage compartment 2 and of the pivoting door 18. As already mentioned, FIG. 1 shows the baggage compartment in its closed position. In order to open the baggage compartment 2, a passenger grasps a handle (not shown) concealed, for example, in the casing 16 of the lower face 8, near the pivoting door 18. In this way it leads the section of the baggage compartment 2 to pivot around its fixed axis of pivoting 4, with a clear rotational movement. This pivoting movement is transmitted by the lever 22 to the pivoting door 18. The latter then pivots in the same direction as the section of the baggage compartment 2. In the embodiment shown and in the scenario of the drawings, during opening of the baggage compartment 2, the section and the pivoting door 18 turn in the clockwise direction. The lever 22 transmits the movement of the section to the pivoting door 18 just as easily in one pivoting direction as in the other.

FIG. 2 shows, by way of illustration, an intermediate position during opening of the baggage compartment 2. On FIG. 3, the baggage compartment 2 is in its open position. In the latter position, the open face of the section of the baggage compartment 2 is fully accessible from the interior of the cabin of the aircraft. The pivoting door 18 is retracted inside the ceiling 6 of the cabin and no longer forms a barrier to accessing the inside of the section of the baggage compartment 2. In this position, the free end of the pivoting door 18 reaches the upper edge of the opening of the section. The pivoting door 18 then is more or less in the extension of the upper face 12. The lower face 8 of the section now is inclined toward the open face. This inclination is, for example, approximately 8°. It makes it possible to facilitate removal of a piece of baggage from the section without its falling down all on its own during opening of the compartment. It also allows a passenger to better see the inside of the section in the open position of the baggage compartment 2.

The advantage of having a pivoting section associated with a pivoting door is to have a great latitude for the form to be imparted to the ceiling 6 of the cabin of the aircraft. By way of example, the form imparted on the attached drawings is a form quite unusual in known aircraft. Other forms, of course, may be contemplated. It would be possible to have, for example, a pivoting door more or less parallel to the back of the section in the closed position of the baggage compartment. Many other forms may be contemplated by the designers.

This invention also offers (in particular by virtue of the use of a fixed axis of pivoting) the advantage of not entailing additional cost in comparison with the standard solutions used in baggage storage. A baggage compartment according to the invention has a cost price similar to that of a baggage compartment of the prior art.

This invention is not limited to the preferred embodiment described above by way of non-limitative example. It also relates to all the variant embodiments within the capacity of the individual skilled in the trade in the context of the following claims.

The invention claimed is:

1. A baggage compartment for an aircraft cabin, comprising:
 a baggage section having an open face allowing access to the baggage section for inserting a baggage inside said baggage section and for removing said baggage from the baggage section, a lower face for supporting said baggage while said baggage is inside said baggage section, as well as a back opposite the open face of the baggage section, said baggage section being mounted so as to pivot around a fixed pivot axis between an open position in which the open face of the baggage section is accessible, and a closed position in which the open face of the section is retracted, said fixed pivot axis extending through the baggage section,
 a pivoting door pivotably mounted so that said pivoting door forms a barrier preventing access to the open face of the baggage section when the baggage section is in said closed position and allows a free access to said open face when the baggage section is in said open position, and
 a connection mechanism that connects the pivoting door and the baggage section so that a pivoting movement of the baggage section brings about a pivoting of the door and/or vice versa.

2. A baggage compartment according to claim 1, in which in said open position of the baggage section, the lower face is inclined with respect to a horizontal plane toward the open face so as to facilitate the removal of said baggage, and whereas in said closed position of the baggage section, the lower face is inclined with respect to the horizontal plane toward the back of the baggage section.

3. A baggage compartment according to claim 2, in which the lower face is inclined with respect to the horizontal plane in said open position by an angle ranging between 0° and 10°.

4. A baggage compartment according to claim 1, in which the fixed pivot axis of the baggage section is substantially centered in relation to the back and the open face of the section.

5. A baggage compartment according to claim 1, in which the lower face of the baggage section comprises an outer casing, and in which the pivoting door is an extension of said outer casing in the closed position of the baggage section.

6. A baggage compartment according to claim 5, in which the pivoting door pivots about a door axis that is parallel to the fixed pivot axis of the baggage section, and in which said door axis is on a side of the pivoting door opposite the outer casing of the lower face of the baggage section.

7. A baggage compartment according to claim 1, in which the pivoting door is substantially an extension of an upper face of the baggage section in the open position.

8. A baggage compartment according to claim 1, in which the connection mechanism includes a lever for transmission of movement, said lever connecting the pivoting door and the baggage section.

9. A baggage compartment according to claim 8, in which the lever has a first arm fastened to the pivoting door near the door axis of the pivoting door, as well as a second arm mounted between an end of the first arm opposite the pivoting door and the baggage section, via a pivot connection.

10. A baggage compartment according to claim 1, in which the connection mechanism is such that during a movement, the baggage section and the door pivot in a same direction.

11. A baggage compartment according to claim 1, wherein said baggage section pivots about said fixed pivot axis such that in said open position the lower face has a first inclination with respect to a horizontal plane and, in said closed position, said lower face has a second inclination with respect to said horizontal plane, said first and second inclinations being different from each other.

12. A baggage compartment according to claim 1, in which, upon pivoting, said pivoting door moves said connection mechanism along a path, and movement of said connection mechanism pivots said baggage section about said fixed pivot axis.

13. An aircraft cabin comprising a ceiling and at least one baggage compartment according to claim 1, wherein said pivoting door is integrated into the ceiling.

14. An aircraft comprising at least one baggage compartment according to claim 1.

* * * * *